(12) United States Patent
Clark

(10) Patent No.: US 8,055,441 B2
(45) Date of Patent: Nov. 8, 2011

(54) SUPPLEMENTAL POWERED INFORMATION RECEIVER

(75) Inventor: Brant Miller Clark, Mt. Baldy, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 1060 days.

(21) Appl. No.: 11/881,495

(22) Filed: Jul. 27, 2007

(65) Prior Publication Data

US 2009/0030610 A1 Jan. 29, 2009

(51) Int. Cl.
G01C 21/00 (2006.01)
(52) U.S. Cl. .......................................................... 701/200
(58) Field of Classification Search ................... 701/200
See application file for complete search history.

(56) References Cited

U.S. PATENT DOCUMENTS

| | | |
|---|---|---|
| 4,481,585 A | 11/1984 | Huntzinger et al. |
| 4,531,123 A | 7/1985 | Tagami et al. |
| 4,651,127 A | 3/1987 | Mayer |
| 4,733,100 A | 3/1988 | Nusairat et al. |
| 4,807,135 A | 2/1989 | Tamai |
| 4,962,462 A | 10/1990 | Fekete |
| 5,065,320 A | 11/1991 | Hayashi et al. |
| 5,073,721 A | 12/1991 | Terrill et al. |
| 5,094,199 A | 3/1992 | Griffin et al. |
| 5,222,245 A | 6/1993 | Ando et al. |
| 5,307,048 A | 4/1994 | Sonders |
| 5,416,702 A | 5/1995 | Kitagawa et al. |
| 5,418,537 A | 5/1995 | Bird |
| 5,465,208 A | 11/1995 | Mochizuki et al. |
| 5,592,173 A | 1/1997 | Lau et al. |
| 5,724,316 A | 3/1998 | Brunts |
| 5,734,238 A | 3/1998 | Yanagisawa et al. |
| 5,734,283 A | 3/1998 | Hedberg |
| 5,767,588 A | 6/1998 | Nakaya et al. |
| 5,788,326 A | 8/1998 | Kawade et al. |
| 5,812,087 A | 9/1998 | Krasner |
| 5,815,824 A | 9/1998 | Saga et al. |
| 5,845,221 A | 12/1998 | Hosokawa et al. |
| 5,845,227 A | 12/1998 | Peterson |
| 5,848,376 A | 12/1998 | Steiner et al. |
| 5,892,346 A | 4/1999 | Moroto et al. |
| 5,914,539 A | 6/1999 | Borgmann et al. |
| 5,922,041 A | 7/1999 | Anderson |

(Continued)

FOREIGN PATENT DOCUMENTS

DE 4114642 11/1992

(Continued)

OTHER PUBLICATIONS

International Patent Application PCT/US2008/070221, International Search Report and Written Opinion, mailed Jan. 28, 2009.

(Continued)

*Primary Examiner* — Isam Alsomiri
(74) *Attorney, Agent, or Firm* — Winston Hsu; Scott Margo

(57) ABSTRACT

Methods and apparatus, including computer program products, for a supplemental powered information receiver. A system includes a processor linked to a memory, the memory including at least a Global Positioning System (GPS) navigation process, a clock and internal timer linked to the processor, a programmable power source linked to the processor, and an information receiver module linked to the processor, the information receiver module receiving information when programmed to power up into a standby mode.

23 Claims, 2 Drawing Sheets

U.S. PATENT DOCUMENTS

| | | | |
|---|---|---|---|
| 5,922,042 | A | 7/1999 | Sekine et al. |
| 6,052,646 | A | 4/2000 | Kirkhart et al. |
| 6,055,479 | A | 4/2000 | Kirkhart et al. |
| 6,059,843 | A | 5/2000 | Kirkhart |
| 6,067,488 | A | 5/2000 | Tano |
| 6,282,495 | B1 | 8/2001 | Kirkhart et al. |
| 6,546,336 | B1 * | 4/2003 | Matsuoka et al. ............ 701/213 |
| 2003/0096623 | A1 * | 5/2003 | Kim .............................. 455/456 |
| 2007/0185644 | A1 * | 8/2007 | Hirose .......................... 701/200 |
| 2008/0021632 | A1 * | 1/2008 | Amano ......................... 701/117 |
| 2011/0022264 | A1 * | 1/2011 | Conan et al. .................... 701/36 |

FOREIGN PATENT DOCUMENTS

| | | |
|---|---|---|
| EP | 0701196 | 12/2002 |
| EP | 1071926 | 9/2003 |
| JP | 6341851 | 12/1994 |
| KR | 20060063629 | 6/2006 |
| KR | 20060071982 | 6/2006 |
| KR | 20070057608 | 6/2007 |
| KR | 20070071664 | 7/2007 |
| WO | 9953272 | 10/1999 |

OTHER PUBLICATIONS

International Patent Application PCT/US08/70221, International Seach Report and Written Opinion (mailed Jan. 28, 2009).

International Patent Application PCT/US99/07424, International Search Report (mailed Jul. 1, 1999).

Transaction History of U.S. Appl. No. 09/060,899, filed Apr. 15, 1998, entitled "Vehicle Navigation System With Improved Powerup Performance," now U.S. Patent Serial No. 6,052,646.

Transaction History of U.S. Appl. No. 09/377,080, filed Aug. 19, 1999, entitled "Vehicle Navigation System With Improved Powerup Performance," now U.S. Patent Serial No. 6,055,479.

Transaction History of U.S. Appl. No. 09/377,586, filed Aug. 19, 1999, entitled "Vehicle Navigation System With Improved Powerup Performance," now U.S. Patent Serial No. 6,059,843.

Transaction History of U.S. Appl. No. 09/550,695, filed Apr. 17, 2000, entitled "Vehicle Navigation System With Improved Powerup Performance," now U.S. Patent Serial No. 6,282,495.

* cited by examiner

SUPPLEMENTAL POWERED INFORMATION RECEIVER

BACKGROUND

The present invention relates to a Global Positioning System (GPS) navigation device, and more particularly to a supplemental powered information receiver.

GPS is a "constellation" of twenty-four well-spaced satellites that orbit the Earth and make it possible for people with ground receivers/devices to pinpoint their geographic location. The location accuracy is typically from 100 meters to 1 meter for most GPS devices.

A popular use of GPS devices is trip navigation. More particularly, GPS navigational devices are often used in conjunction with vehicles to map out or route directions between two geographic points for a vehicle operator, i.e. a geographic origin and a geographic destination. Most GPS navigational devices enable a user to enter geographic origin and destination points interactively and provide an ability to store such pairs of points as routes.

SUMMARY

The present invention provides methods and apparatus, including computer program products, for a supplemental powered information receiver.

In general, in one aspect, the invention features a system including a processor linked to a memory, the memory including at least a Global Positioning System (GPS) navigation process, a clock and internal timer linked to the processor, a programmable power source linked to the processor, and an information receiver module linked to the processor, the information receiver module adapted to receive information when programmed to power up into a standby mode.

In embodiments, the received information can be traffic information. The received information can be selected from the group consisting of traffic information, local event information, news information and weather information.

The system can include a user interface. The user interface can be configured to receive input to program the power source.

The programmable power source can be a battery.

The GPS navigation process can calculate a route between an origin and a destination in response to the received traffic information.

The information receiver module can be powered down after a period of time. The period of time can be user-selectable.

The programmable power source can be programmed to power up the information receiver module at one or more selected times. The programmable power source can be programmed to disable power up of the information receiver module at one or more selected times. The programmable power source can be programmed to power up the information receiver module at one or more selected times and disable power up of the information receiver module at one or more selected times.

In another aspect, the invention features a programmable Global Positioning System (GPS) navigation apparatus including a processor linked to a memory, the memory including at least a Global Positioning System (GPS) navigation process, a clock and internal timer linked to the processor, a user interface linked to the processor, a programmable battery power source linked to the processor, and an information receiver module linked to the processor, the information receiver module adapted to receive information when programmed to power up into a standby mode by the programmable battery power source.

In embodiments, the received information can be selected from the group consisting of traffic information, local event information, news information and weather information.

The user interface can be configured to receive input to program the power source.

The GPS navigation process can calculate a route between an origin and a destination in response to the received traffic information.

The information receiver module can be powered down after a period of time. The period of time can be user-selectable.

The programmable battery power source can be programmed to power up the information receiver module at one or more selected times. The programmable battery power source can be programmed to disable power up of the information receiver module at one or more selected times. The programmable battery power source can be programmed to power up the information receiver module at one or more selected times and disable power up of the information receiver module at one or more selected times.

In another aspect, the invention features a method including inputting a wake up time to a programmable a Global Position System (GPS) navigational device, powering up the GPS navigational device to a standby mode in response to the wake up time, and receiving information through an information receiver module in the GPS navigational device.

In embodiments, the received information can be traffic information. The method can include calculating a route from an origin to a destination in response to the received traffic information.

The GPS navigational device can include a processor linked to a memory, the memory including at least a Global Positioning System (GPS) navigation process, a clock and internal timer linked to the processor, a programmable power source linked to the processor, and the information receiver module linked to the processor.

Inputting the wake up time can include inputting multiple wake up times. Inputting the wake up time can include inputting a sleep time. The method can include powering down the GPS navigational device in response to the sleep time.

The invention can be implemented to realize one or more of the following advantages.

The device includes a battery capable of powering up an information receiver module at certain user-selectable times for the purpose of receiving information. If the information is traffic information, a method can re-calculating a route between an origin and a destination prior to trip initiation.

Other features and advantages of the invention are apparent from the following description, and from the claims.

BRIEF DESCRIPTION OF THE DRAWINGS

Like reference numbers and designations in the various drawings indicate like elements.

DETAILED DESCRIPTION

Figure 1:
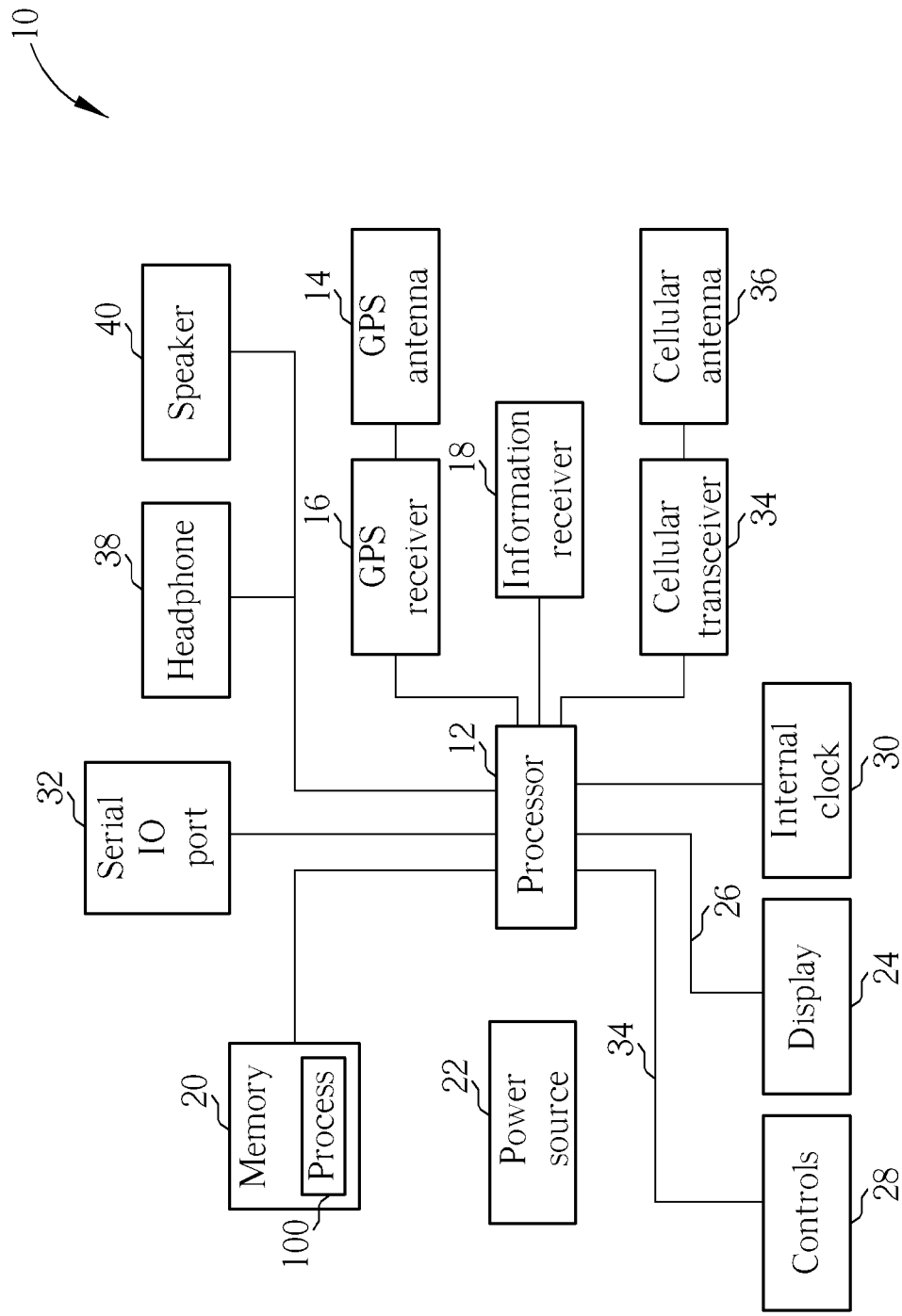
FIG. 1 is a block diagram of an exemplary GPS navigational device.

As shown in FIG. 1, an exemplary Global Positioning System (GPS) navigational device 10 includes a processor 12 that is connected to a GPS antenna 14 through GPS receiver 16. The GPS antenna 14 is configured to receive GPS signals from satellites.

In this exemplary device 10, processor 12 includes a connection to an information receiver module 18. Example information receiver modules 18 include receivers adapted to receive traffic information, weather information, local content and so forth.

In one particular example, the information receiver module 18 is a traffic information receiver module, i.e., a RDS-TMC receiver. In general, the Radio Data System (RDS) enables the GPS navigational device 10 to scan for a particular type of program without having to manipulate a tuning dial. For example, a user who is traveling or commuting in a vehicle may wish to receive traffic messages to enable recalculation of a trip route between an origin and a destination.

In general, Traffic Message Channel (TMC) is a technology for delivering traffic and travel information to vehicle operators. TMC is typically digitally coded using the FM-RDS system on conventional FM radio broadcasts. TMC can also be transmitted on satellite radio or through RDS. TMC enables delivery of high quality, accurate, timely and relevant traffic information. When TMC data is integrated into the GPS navigational device 10, updated trip routes between an origin and a destination can be calculated and displayed to the user to avoid, for example, delays resulting form unforeseen traffic incidents.

Processor 12 is coupled to memory 20 and to a programmable power source 22. In a particular example, the GPS navigational device 10 includes a programmable power source 22 that includes a primary (e.g., vehicular) source and a battery (e.g., secondary) source.

Memory 20 includes a GPS navigation process 100 that calculates a present location (e.g., latitude, longitude and altitude) of the GPS navigational device 10 based on received GPS signals and a route between a geographic origin and a geographic destination. Navigation process 100 can recalculate a route in response to traffic messages received by the receiver 18. More particularly, a user can pre-program a time or times prior to a journey's initiation to receive content at user-selectable times and, in the example of content that is traffic information, the GPS navigation process 100 can calculate a route according to this received traffic information. User selection of times to activate the GPS navigational device 10 using the battery source prevents the GPS navigational device 10 from depleting the programmable power source 22.

More particularly, the battery is capable of powering the receiver 18, an internal clock and a standby mode to wake up the GPS navigational device 10 at certain user-selected times each day for the purpose of receiving information. Multiple times can be programmed to enable the receiver 18 to wake up multiple times during any period of time. For example, the programmable power source 22 can be programmed to wake up the receiver 18 just prior to a morning commute and just prior to an evening commute. In addition, the programmable power source 22 can disable receiver 18 wake up at selected times, such on weekends, for example. Wakeup times can be set and enabled in a settings menu shown on a display 24. In one particular example, the GPS navigational device 10 is configured to power down after a certain period of time (e.g., 30 minutes) if the GPS navigational device 10 fails to detect movement (through GPS or other sensor) of a vehicle in which the GPS navigational device 10 is contained or receive a specific input from the user.

The settings menu described above can provide a user an option of routing to a predefined place (e.g., address, POI, latitude/longitude, intersection, and so forth) whenever the GPS navigational device 10 wakes up to receive information. In this fashion, a route can been calculated and the GPS navigational device 10 ready to go when the user gets into the vehicle.

The processor 12 communicates with the display 24 via data line 26 to output various types of information, such as roadway maps, menus, alphanumeric text, graphics, video, still images, pictures, routing information generated by navigation process 100, and so forth. The display 24 can be adapted to display all or part of the navigation information (e.g., roadway maps, addresses, names, phone, numbers, real-time moving maps, simulated video advancement over a roadway network and so forth) and menu structure or hierarchy (e.g., page layouts, page pixel formats, coloring, menu item names, forward and return links to other menu pages and so forth).

The GPS navigational device 10 can include controls 28 connected to the processor 12 via line 34.

The GPS navigational device 10 includes internal clock 30.

The GPS navigational device 10 can include a serial I/O port 32 connected to the processor 12.

The GPS navigational device 10 may optionally include a cellular antenna 34 connected to a cellular transceiver 36 and linked to the processor 12.

Processor 12 may be connected to a headphone 38 and/or speaker 40. Speaker 40 can output audio navigation information or other content. For example, the speaker 56 can output turn-by-turn directions, words or phrases and so forth.

The GPS navigational device 10 can also include an infrared port coupled to the processor 12 that may be used to transmit information from one device to another.

If GPS navigational device 10 is being used near a freeway and traffic information delayed for up five minutes, for example, a user may be driving on a freeway, and perhaps stuck in traffic, before traffic information affecting that freeway is received and a route recalculated by the GPS navigational process 100. Since the GPS navigational device 10 includes a battery that is capable of powering the receiver module 18, the internal clock and a standby mode, a user can program the GPS navigational device 10 to power on in a standby mode using battery power prior to trip initiation. When the GPS navigational device 10 is powered up in the standby mode, messages can be received by the information receiver module 18 and a route calculated by the GPS navigation process 100 in response to any messages affecting an intended route. In a particular example, the GPS navigational device 10 saves the route and is powered down to conserve battery energy after a certain period of user-specified time or default time (e.g., 30 minutes) in the event that the GPS navigational device 10 fails to detect movement (through GPS or other sensor).

Figure 2:
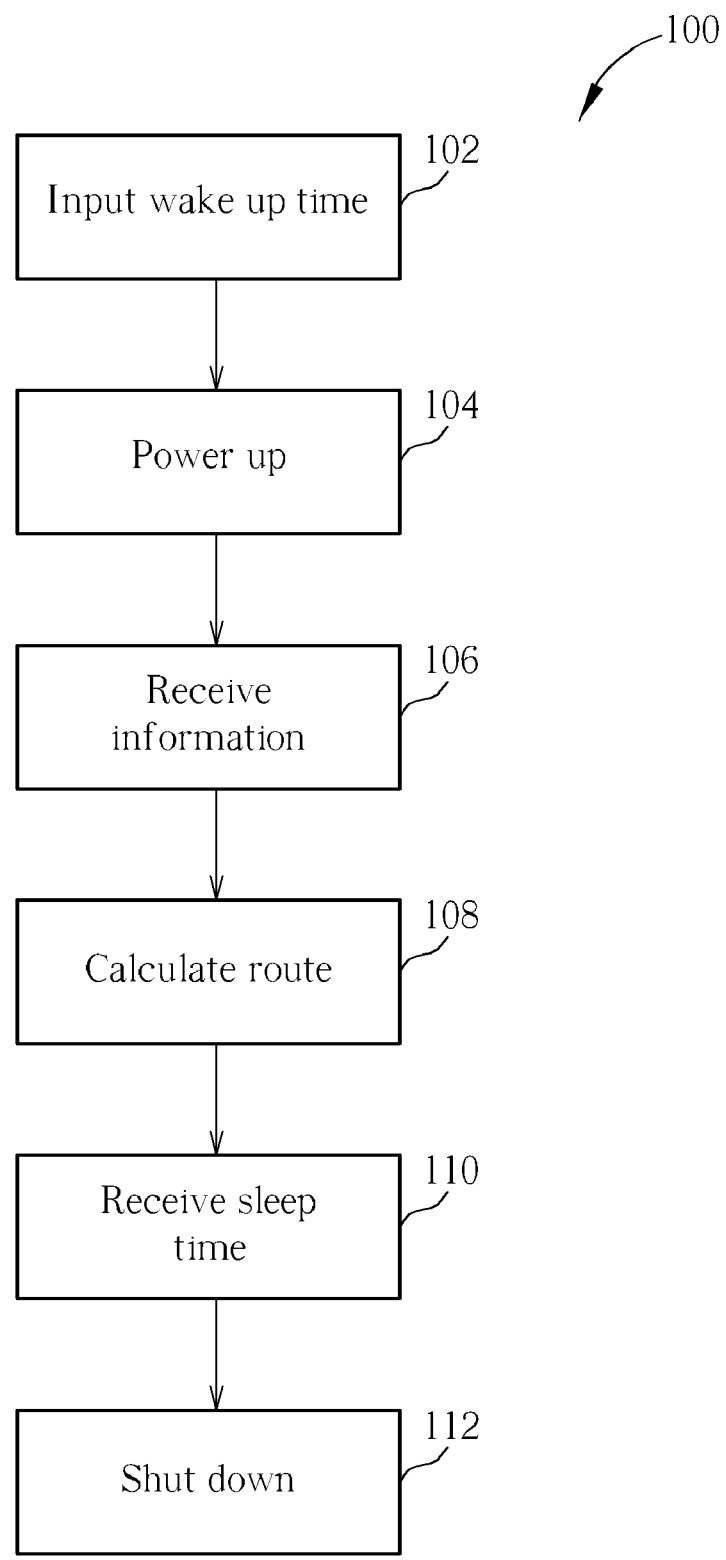
FIG. 2 is a flow diagram of a GPS navigation process.

As shown in FIG. 2, the GPS navigational process 100 includes inputting (102) a wake up time to a programmable a Global Position System (GPS) navigational device. Process 100 powers up (104) the GPS navigational device to a standby mode in response to the wake up time. Process 100 receives (106) information through an information receiver module in the GPS navigational device. Process 100 calculates (108) a route from an origin to a destination in response to the received information.

Process 100 can receive (110) a sleep time and shut down (112) the GPS navigational device in response to the sleep time.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A system comprising:
    a processor linked to a memory, the memory including at least a Global Positioning System (GPS) navigation process;
    a clock and internal timer linked to the processor;
    a programmable power source linked to the processor; and
    an information receiver module linked to the processor, the information receiver module adapted to receive information when programmed to power up into a standby mode; wherein the information receiver module is powered down after a set period of time while in standby mode.

2. The system of claim 1 wherein the received information is traffic information.

3. The system of claim 1 wherein the received information is selected from the group consisting of traffic information, local event information, news information and weather information.

4. The system of claim 1 further comprising a user interface.

5. The system of claim 4 wherein the user interface is configured to receive input to program the power source.

6. The system of claim 1 wherein the programmable power source is a battery.

7. The system of claim 2 wherein the GPS navigation process calculates a route between an origin and a destination in response to the received traffic information.

8. The system of claim 1 wherein the set period of time is user-selectable.

9. The system of claim 1 wherein the programmable power source is programmed to power up the information receiver module at one or more selected times.

10. The system of claim 1 wherein the programmable power source is programmed to disable power up of the information receiver module at one or more selected times.

11. The system of claim 1 wherein the programmable power source is programmed to power up the information receiver module at one or more selected times and disable power up of the information receiver module at one or more selected times.

12. A programmable Global Positioning System (GPS) navigation apparatus comprising:
    a processor linked to a memory, the memory including at least a Global Positioning System (GPS) navigation process;
    a clock and internal timer linked to the processor;
    a user interface linked to the processor;
    a programmable battery power source linked to the processor; and
    an information receiver module linked to the processor, the information receiver module adapted to receive information when programmed to power up into a standby mode by the programmable battery power source; wherein the information receiver module is powered down after a set period of time while in standby mode.

13. The system of claim 12 wherein the received information is selected from the group consisting of traffic information, local event information, news information and weather information.

14. The system of claim 12 wherein the user interface is configured to receive input to program the power source.

15. The system of claim 13 wherein the GPS navigation process calculates a route between an origin and a destination in response to the received traffic information.

16. The system of claim 13 wherein the set period of time is user-selectable.

17. The system of claim 12 wherein the programmable battery power source is programmed to power up the information receiver module at one or more selected times.

18. The system of claim 12 wherein the programmable battery power source is programmed to disable power up of the information receiver module at one or more selected times.

19. The system of claim 12 wherein the programmable battery power source is programmed to power up the information receiver module at one or more selected times and disable power up of the information receiver module at one or more selected times.

20. A method comprising:
    inputting a wake up time to a programmable a Global Position System (GPS) navigational device;
    powering up the GPS navigational device to a standby mode in response to the wake up time; and
    receiving information through an information receiver module in the GPS navigational device while powered in standby mode; and powering down the information receiver module after a set period of time while in standby mode.

21. The method of claim 20 wherein the received information is traffic information.

22. The method of claim 21 further comprising calculating a route from an origin to a destination in response to the received traffic information.

23. The method of claim 20 wherein the GPS navigational device comprises:

a processor linked to a memory, the memory including at least a Global Positioning System (GPS) navigation process;

a clock and internal timer linked to the processor;

a programmable power source linked to the processor; and the information receiver module linked to the processor.

* * * * *